United States Patent
Graves et al.

(10) Patent No.: US 10,798,879 B1
(45) Date of Patent: Oct. 13, 2020

(54) TEMPORAL, IRRADIANCE-CONTROLLED PHOTOACCLIMATION

(71) Applicant: Fluence Bioengineering, Inc., Austin, TX (US)

(72) Inventors: Steven Graves, Austin, TX (US); Gregory Hovagim, Austin, TX (US); M. Travis Higginbotham, Lockhart, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 0 days.

(21) Appl. No.: 16/454,409

(22) Filed: Jun. 27, 2019

(51) Int. Cl.
*A01G 7/04* (2006.01)
*H05B 47/105* (2020.01)
*G06F 3/0481* (2013.01)

(52) U.S. Cl.
CPC .......... *A01G 7/045* (2013.01); *H05B 47/105* (2020.01); *G06F 3/0481* (2013.01)

(58) Field of Classification Search
CPC ....... A01G 7/045; A01G 9/249; Y02P 60/146; Y02P 60/149; H05B 37/02; H05B 37/0227; H05B 37/0272; H05B 45/10; H05B 47/10; F21Y 2115/10; A01B 79/005
See application file for complete search history.

(56) References Cited

U.S. PATENT DOCUMENTS

| | | | | |
|---|---|---|---|---|
| 9,060,468 | B2* | 6/2015 | Klase | F21V 5/007 |
| 10,021,837 | B2* | 7/2018 | Greenberg | H05B 37/0227 |
| 10,149,439 | B2* | 12/2018 | Hanson | A01G 7/045 |
| 10,448,483 | B2* | 10/2019 | Ashdown | H05B 47/16 |
| 2013/0258684 | A1* | 10/2013 | Yang | A01G 7/045 362/386 |
| 2015/0164009 | A1* | 6/2015 | Chandran | G05B 15/02 700/284 |
| 2015/0351325 | A1* | 12/2015 | Shelor | A01G 7/045 47/58.1 LS |
| 2019/0259108 | A1* | 8/2019 | Bongartz | A01B 79/005 |

* cited by examiner

*Primary Examiner* — Haissa Philogene
(74) *Attorney, Agent, or Firm* — Yutian Ling

(57) ABSTRACT

A lighting system for temporal, irradiance-controlled photoacclimation includes a photoacclimation controller configured to generate control signals based on a photoacclimation schedule, a user interface configured to receive user input to the photoacclimation controller, the photoacclimation schedule based on the user input, a plurality of luminaires configured to emit light suitable for photosynthesis in plants at a plurality of different selectable levels of light output, and a communications network via which the control signals are provided to the plurality of luminaires, the luminaires adjusting the light output in response to the control signals.

18 Claims, 5 Drawing Sheets

| 202 → Stage | Cloning | Vegetative (bulking) | Acclimation to Bloom (flowering) | Flowers maturing |
|---|---|---|---|---|
| 206 → WK# | 1 \| 2 | 3 \| 4 \| 5 | 6 \| 7 \| 8 \| 9 \| 10 \| 11 | 12 \| 13 \| 14 |
| | 18 hr photoperiod (LD) | | 12 hr photoperiod (SD) | |
| 204 → PPFD | 80 – 250 | 250 – 650 | 650 ---------- 950 ----→ | |

Photoacclimation Schedule 200

Figure 2

TEMPORAL, IRRADIANCE-CONTROLLED PHOTOACCLIMATION

TECHNICAL FIELD

The subject matter of this disclosure is generally related to lighting, and more particularly to lighting systems for horticulture.

BACKGROUND

Luminaires and artificial light sources that emit light suitable for photosynthesis in plants are known. Sometimes referred to as "grow lights," they may, but do not necessarily, generate light with a characteristic spectrum like that of the sun. Grow lights may be based on a variety of technologies including but not limited to incandescent, fluorescent, and LED (light-emitting diode). A typical implementation may include a timer that automatically turns the grow lights on and off at set times each day to control the number of hours of daily exposure of the plants to the generated light.

Photacclimation is the process of acclimating a plant to a particular light environment. In outdoor environments, the day-night schedule, weather patterns, and changing shade from neighboring plants and other structures provide natural photoacclimation to crops planted outside. However, in an indoor environment grow lights replace natural light sources. Sudden exposure to a strong light source, for example from turning a grow light on, may cause negative effects in plants because there is no photoacclimation period. Growers may manually change the intensity of the grow lights over time to mimic photoacclimation, but this is time-consuming and prone to errors, especially considering different plants may have different responses under the same photoacclimation schedule. Thus there is a need to implement efficient and accurate photoacclimation in indoor growing environments.

SUMMARY

All examples, aspects and features mentioned in this document can be combined in any technically possible way. Various implementations described herein include an apparatus that includes a user interface configured to receive user input, and a photoacclimation controller configured to calculate a photoacclimation schedule for one or more plants based on the user input, and generate control signals that adjust light output of at least one luminaire to implement the photoacclimation schedule.

In some implementations, the user input includes at least one of genus, species, variety, and cultivar of the one or more plants. In some implementations, the photoacclimation controller is further configured to adjust the photoacclimation schedule based on further input from at least one of a user and a sensor. In some implementations, the further input includes at least one of start time, run time, light level entered, a ramp-up duration, a ramp-down duration, duration of the photoacclimation schedule, and maximum dimming. In some implementations, the photoacclimation controller is further configured to dynamically adjust the photoacclimation schedule during implementation of the photoacclimation schedule based on the further input. In some implementations, the photoacclimation schedule includes PPFD (photosynthetic photon flux density) values for one or more stages of growth and the photoacclimation controller is further configured to adjust the light output based on the PPFD values. In some implementations, the PPFD values increase over time.

Further implementations disclosed herein include a method that includes receiving, via a user interface of a controller, user input for generating a photoacclimation schedule for one or more plants, calculating the photoacclimation schedule based on the user input, and generating control signals that adjust light output of at least one luminaire to implement the photoacclimation schedule.

In some implementations, the user input includes at least one of: genus, species, variety, and cultivar of the one or more plants. In some implementations, the method further includes adjusting the photoacclimation schedule based on further input from at least one of a user and a sensor. In some implementations, the further input includes at least one of start time, run time, light level entered, a ramp-up duration, a ramp-down duration, duration of the photoacclimation schedule, and maximum dimming. In some implementations, adjusting the photoacclimation schedule includes dynamically adjusting the photoacclimation schedule during implementation of the photoacclimation schedule based on the further input. In some implementations, the photoacclimation schedule includes PPFD (photosynthetic photon flux density) values for one or more stages of growth, and the control signals adjust the light output of the at least one luminaire based on the PPFD values. In some implementations, the method further includes transmitting the control signals to the at least one luminaire, and adjusting, by the at least one luminaire, the light output of the at least one luminaire according to the photoacclimation schedule. In some implementations, the controller transmits the user input to a server, the server calculates the photoacclimation schedule and transmits the photoacclimation schedule to the controller, and the controller generates the control signals based on the photoacclimation schedule.

Further implementations disclosed herein include a system that includes a photoacclimation controller configured to generate control signals based on a photoacclimation schedule, a user interface configured to receive user input to the photoacclimation controller, the photoacclimation schedule based on the user input, a plurality of luminaires configured to emit light suitable for photosynthesis in plants at a plurality of different selectable levels of light output, and a communications network via which the control signals are provided to the plurality of luminaires, the luminaires adjusting the light output in response to the control signals.

In some implementations, the user input includes at least one of: genus, species, variety, and cultivar of plants to be photoacclimated. In some implementations, the photoacclimation controller is further configured to calculate the photoacclimation schedule based on the user input. In some implementations, the photoacclimation controller is further configured to adjust the photoacclimation schedule based on further input from at least one of a user and a sensor. In some implementations, the system further includes a server communicatively coupled to the photoacclimiation controller via the communications network, in which the controller is further configured to transmit the user input to the server and receive the photoacclimation schedule from the server, and the server is configured to calculate the photoacclimation schedule based on the user input. In some implementations, the server is further configured to adjust the photoacclimation schedule based on further input from at least one of a user and a sensor.

These and other features will be understood better by reading the following detailed description, taken together with the figures herein described. The accompanying figures are not intended to be drawn to scale. Each identical or nearly identical component that is illustrated in various figures may be represented by a like numeral. For purposes of clarity, not every component may be labeled in every figure.

BRIEF DESCRIPTION OF THE FIGURES

FIG. 2 illustrates a photoacclimation schedule in accordance with various implementations.

DETAILED DESCRIPTION

Figure 1:
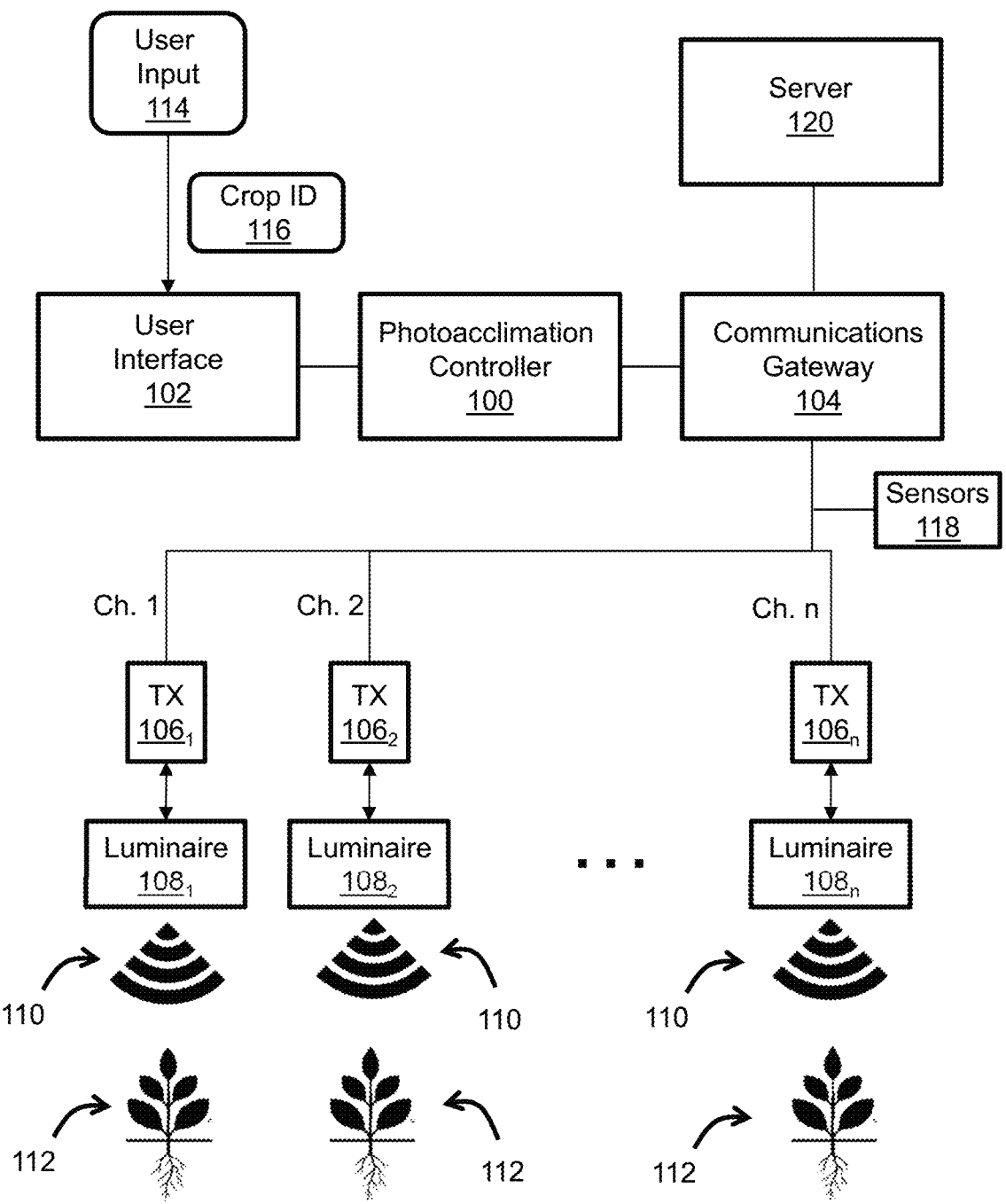
FIG. 1 is a block diagram of a lighting system for temporal, irradiance-controlled photoacclimation in accordance with various implementations.

The methods and systems described herein are not limited to any hardware or software configuration and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors and may be stored on one or more storage medium readable by the processor (including volatile and non-volatile memory and/or storage elements), one or more input devices, and/or one or more output devices. The processor thus may access one or more input devices to obtain input data and may access one or more output devices to communicate output data. The input and/or output devices may include one or more of the following: SSD (solid state drive), HDD (hard disk drive), RAM (Random Access Memory), RAID (Redundant Array of Independent Disks), floppy drive, CD (compact disk), DVD (digital video disk), magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some implementations, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

FIG. 1 is a block diagram of a lighting system for temporal, irradiance-controlled photoacclimation in accordance with various implementations. The lighting system may include a photoacclimation controller 100, a user interface 102, a communications gateway 104, transceivers $106_1$ through $106_n$, luminaires $108_1$ through $108_n$, and one or more sensors 118. The photoacclimation controller 100 may include any of a wide variety of computing devices with processors, volatile memory, and non-volatile storage. In some implementations the photoacclimation controller 100 includes a PLC (programmable logic controller) that has been ruggedized and adapted for use in wet and humid environments. The user interface 102 may include one or more of a touchscreen, keyboard, mouse, and display for interfacing with a photoacclimation control program running on the photoacclimation controller 100. The communications gateway 104, which is connected to the photoacclimation controller, may include a wide variety of network devices including, but not limited to, switches, routers, and wireless access points. The transceivers $106_1$ through $106_n$ may include a wide variety of network devices including, but not limited to, switches, routers, and WLAN (wireless local area network) interface cards and devices. The communications gateway and transceivers may be part of a communications network. Wireless or wireline communication links are maintained between the communications gateway 104 and the transceivers $106_1$ through $106_n$. The luminaires $108_1$ through $108_n$, each of which is connected to a corresponding transceiver, emit light suitable for photosynthesis in plants. The luminaires are configurable to emit light at multiple different selectable levels of light output (e.g., light intensity, light wavelength, irradiance) in response to signals from the photoacclimation controller.

In response to user input 114 provided via the user interface 102 the photoacclimation controller 100 may calculate and implement a photoacclimation schedule to photoacclimate the plants 112. A photoacclimation schedule may be, for example, a schedule of light output levels (e.g., light intensity, light wavelengths, irradiance) that should be provided to a crop over a period of time (e.g., over a number of weeks that represent the growing cycle of the crop). For example, a photoacclimation schedule may include a plurality of photosynthetic photon flux density (PPFD) values, each value associated with a time or time period, as further described with respect to FIG. 2. Each time or time period may represent a stage of growth for the plant. The user input 114 may include a crop ID (identification) 116 that indicates one or more of the genus, species, variety, and cultivar of the plants to be photoacclimated. In some implementations the crop ID is selected from a menu presented on the user interface 102. The user input 114 may also include climate parameters, duration of the growth stage, duration of the photoacclimation cycle, and one or more time periods with corresponding irradiance deltas. The photoacclimation controller 100 calculates a photoacclimation schedule for the plants 112 based on the crop ID 116 and adjusts the photoacclimation schedule based on the other user input (if any). The photoacclimation controller 100 then controls the light output of the luminaires $108_1$ through $108_n$ over a period, e.g. days or weeks, by sending control signals via the communications gateway 104 and transceivers $106_1$ through $106_n$ to adjust light output 110 of the luminaires $108_1$ through $108_n$ to implement the photoacclimation schedule to photoacclimate the plants 112.

The photoacclimation controller 100 may also receive input from one or more sensors 118. The sensors 118 may include, for example, humidity sensors, ambient light sensors, solar radiation sensors, temperature sensors, pressure sensors, water quality sensors (e.g., pH sensors), image or optical sensors, laser scanners, spectroscopy sensors, near-infrared sensors, time of flight sensors, depth ranging sensors, air quality sensors, acoustic sensors, air composition sensors, soil or mineral sensors and any other type of environmental sensors. The photoacclimation controller 100 may adjust the photoacclimation schedule based on the sensor input. This can be done when initially calculating the photoacclimation schedule, and also while the photoacclimation schedule is being implemented, so that there is real-time, dynamic adjustment to the photoacclimation schedule. For example, light sensors may detect solar radiation entering from windows in an indoor farming environment and irradiating the plants. The photoacclimation controller 100 may adjust the light output of the luminaires to account for the solar radiation so that the plants are irradiated consistent with the original photoacclimation schedule. The photoacclimation controller 100 can also adjust the photoacclimation schedule based on user input received during implementation of the photoacclimation schedule.

In some implementations, the photoacclimation controller 100 may be in communication with a server 120 via the communications gateway 104. For example, the server 120 may be a cloud server that connects to the photoacclimation controller 100 over a wide area network (e.g., the Internet) or a local area network. In some implementations, the photoacclimation controller 100 may transmit the user and sensor input to the server 120, and the server 120 calculates and adjusts the photoacclimation schedule. The server 120 may then transmit the photoacclimation schedule back to the photoacclimation controller 100, which generates control signals to implement the photoacclimation schedule and transmits the control signals to the luminaires 108.

FIG. 2 illustrates a photoacclimation schedule 200 in accordance with various implementations. The illustrated photoacclimation schedule is in a human-readable form. A corresponding computer-readable form of the photoacclimation schedule may be created in any suitable data structure. The crop cycle includes growth stages 202 such as cloning, vegetative, acclimation to bloom, and flowers maturing. Irradiance (i.e., light output) of the luminaires is set to a relatively low-level during establishment growth as the plants develop roots, leaves, and stems that will be used to provide photosynthates during the subsequent vegetative growth stage. The irradiance is increased during the vegetative and reproductive growth stages to support increased rates of photosynthesis which provide the plants with more photosynthates for developing flowers and subsequent fruit and biomass. Increasing irradiance too rapidly or starting with full irradiance can damage chlorophyll pigments and cause photo-oxidation. In addition to preventing damage to plants, implementing a photoacclimation schedule may reduce stress on the electrical load of the indoor farming environment and thus provide cost savings.

Light energy for plants is measured as PAR (photosynthetic active radiation), with light falling onto a surface of the pant measured as PPFD (photosynthetic photon flux density) in units of $\mu mol/m^2/s$. The photoacclimation schedule 200 includes PPFD values 204 associated with days or weeks 206 of the crop cycle. In general, the irradiance is temporally controlled to increase PPFD by 50 $\mu mol/m^2/s$ or less per day. In the illustrated implementation the photoacclimation controller adjusts the light output of the luminaires to increase PPFD from an initial setting of 80 to 250 $\mu mol/m^2/s$ during the first two weeks of the photoacclimation schedule 200. The photoacclimation controller adjusts the light output of the luminaires to increase PPFD from 250 to 650 $\mu mol/m^2/s$ during weeks three through five of the photoacclimation schedule 200. The photoacclimation controller adjusts the light output of the luminaires to increase PPFD from 650 to 950 $\mu mol/m^2/s$ during weeks six through eight of the photoacclimation schedule 200 and continues with 950 $\mu mol/m^2/s$ for the remainder of the photoacclimation schedule. The photoperiod may be static or varied during the photoacclimation schedule 200. The irradiance may be calculated based on photoperiod and/or DLI (daily light integral).

Referring again to FIG. 1, each luminaire $108_1$ through $108_n$ may be individually controllable by the photoacclimation controller 100. For example, luminaire $108_1$ may be associated with channel 1 (Ch. 1) and luminaire $106_2$ may be associated with independently controlled channel 2 (Ch. 2). In some implementations different channels are used to implement different photoacclimation schedules for different types of plants, e.g. plants having different crop IDs. In some implementations different channels are used to implement the same photoacclimation schedule for plants that have the same crop ID but are at different stages of the crop cycle. For example, channel 1 could be in the vegetative growth stage while channel 2 is in the flowering stage.

Figure 3:
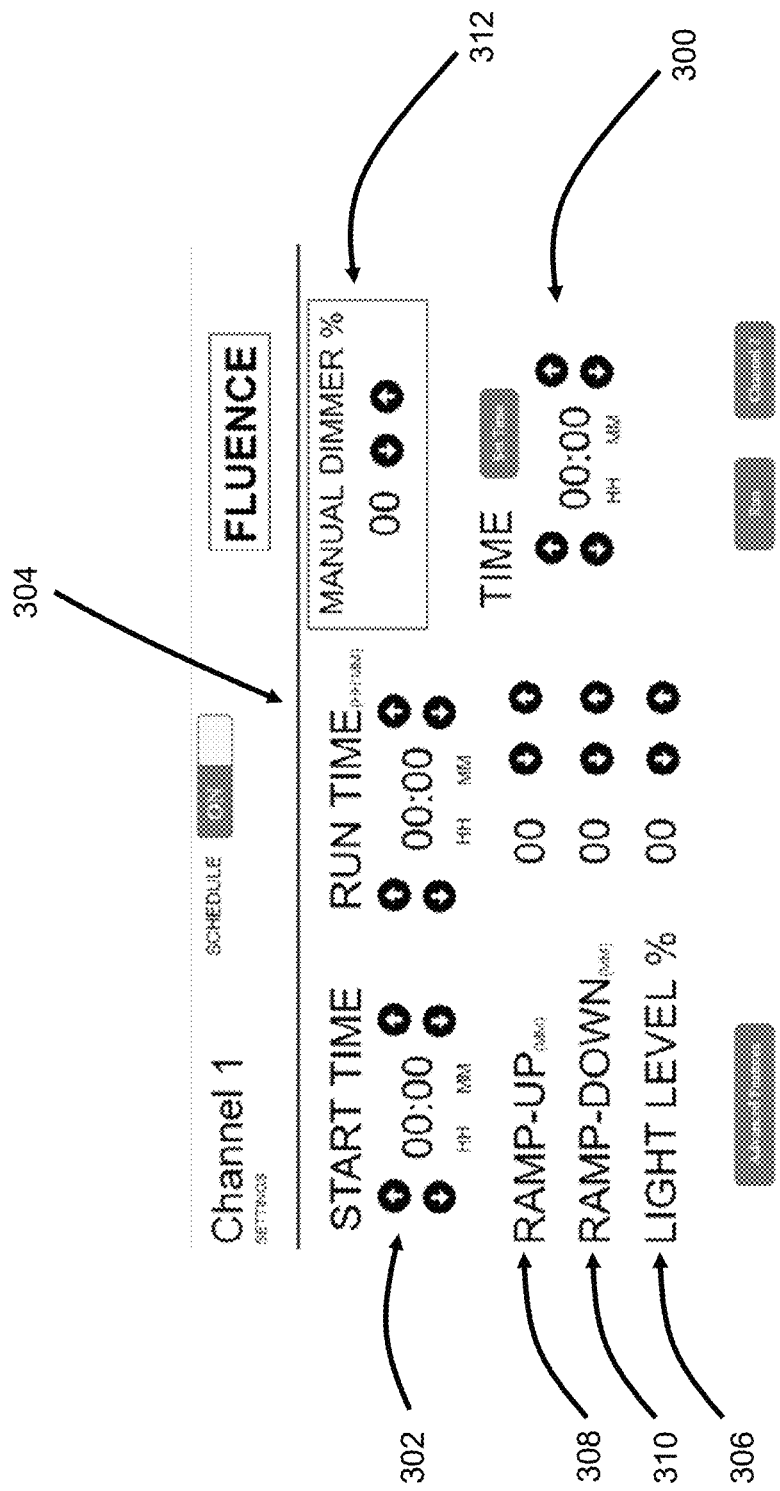
FIGS. 3 and 4 illustrate aspects of the user interface in accordance with various implementations.
Figure 4:
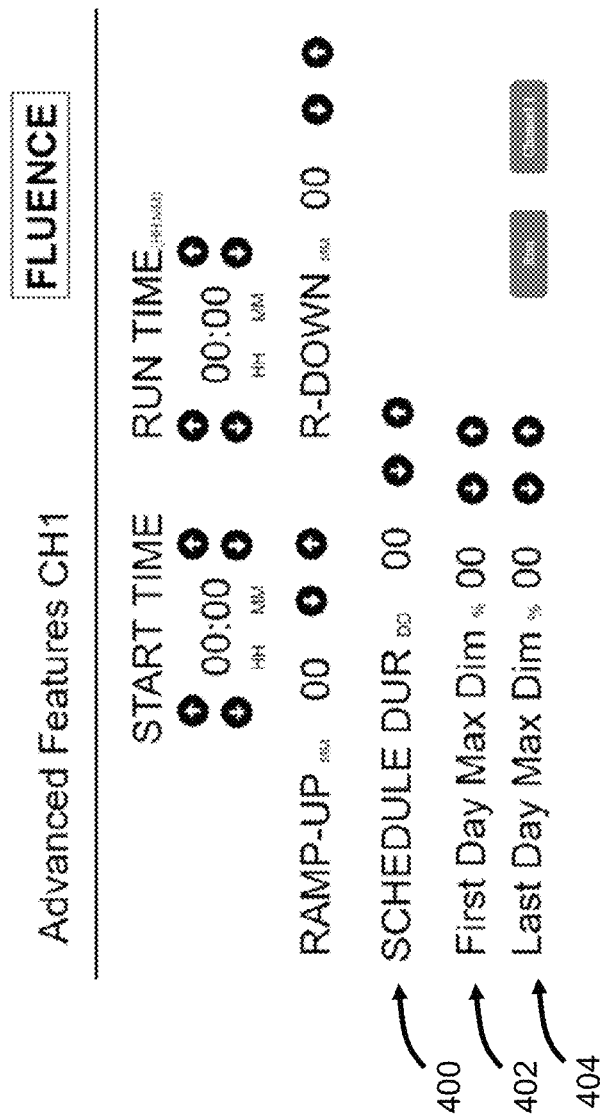

FIGS. 3 and 4 illustrate aspects of the user interface in accordance with various implementations. A user interface window may enable setting of parameters to control lighting for a single channel, e.g. channel 1. Various parameters that are automatically calculated based on the crop ID may be adjusted to create customized temporal lighting profiles. The time 300, start time 302, and run time 304 can each be entered, e.g. in terms of hours and minutes. Further, the light level 306 can be set, e.g. as a percentage of maximum irradiance, and a ramp-up duration 308 and ramp-down duration 310 for increasing irradiance to, and decreasing irradiance from, the maximum for the day may be set. The luminaire associated with the channel can also be manually dimmed via the interface using a manual dimmer 312. As illustrated in FIG. 4, the duration 400 of the photoacclimation schedule may be set (in days) and maximum dimming for the first day 402 and last day 404 may be set, e.g. as a percentage of maximum irradiance.

Figure 5:
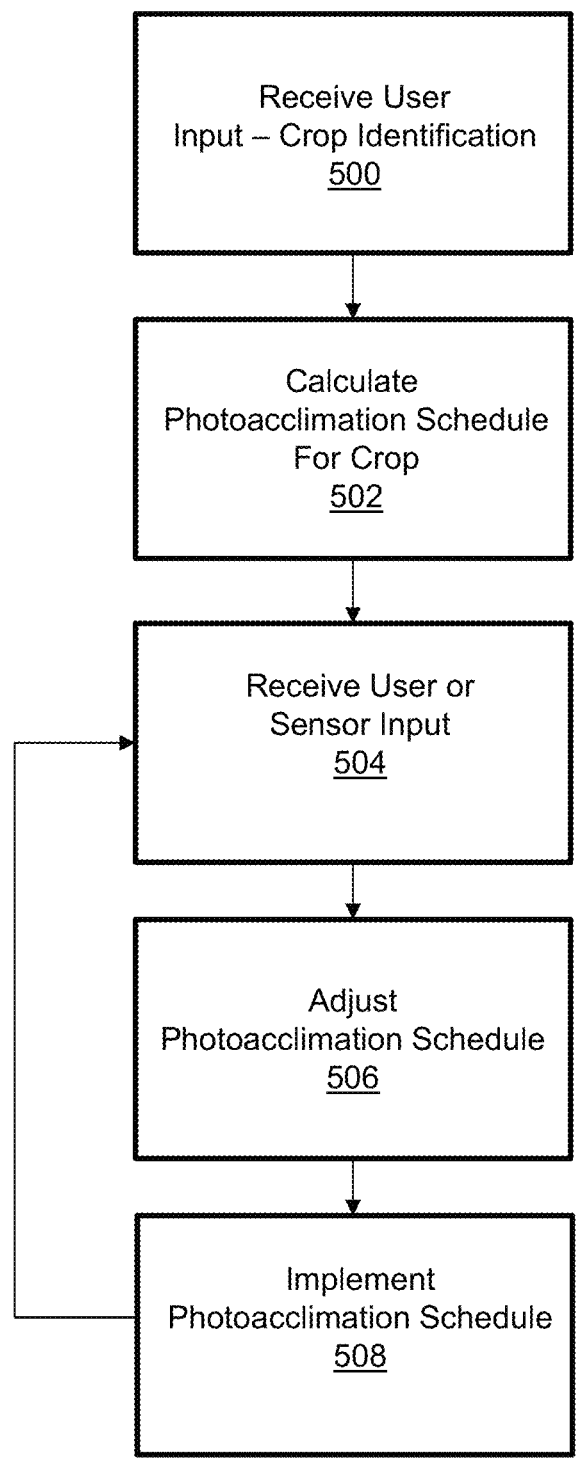
FIG. 5 illustrates a process for temporal, irradiance-controlled photoacclimation in accordance with various implementations.

FIG. 5 illustrates a process for temporal, irradiance-controlled photoacclimation in accordance with various implementations. Some or all steps may be partially or wholly implemented by the photoacclimation program running on the photoacclimation controller. Step 500 includes receiving the crop ID as user input. The crop ID indicates one or more of genus, species, variety, and cultivar of the plants to be photoacclimated. Step 502 includes calculating the photoacclimation schedule based on the crop ID. Step 504 includes receiving user input and/or sensor input. The input may include sensor data, climate parameters, duration of growth stage, duration of crop cycle, and one or more time periods with corresponding irradiance deltas.

Step 506 includes adjusting the photoacclimation schedule based on the received user and/or sensor inputs. Step 508 includes implementing the photoacclimation schedule by controlling the luminaires to emit light output at levels in accordance with the photoacclimation schedule. For example, the photoacclimation may transmit control signals to the luminaires via the communications gateway, and the luminaires may adjust their respective light output levels according to the photoacclimation schedule. The method may then return to step 504, in which the photoacclimation controller may receive user and/or sensor input during implementation of the photoacclimation schedule. The photoacclimation controller may adjust the photoacclimation schedule based on the user and/or sensor input, and implement the adjusted photoacclimation schedule. This allows for a photoacclimation system that dynamically adjusts based on real-time events (e.g., changes in grow environment, user intervention).

Several features, aspects, implementations and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus, comprising:
a user interface configured to receive user input; and
a photoacclimation controller configured to:
transmit the user input to a server;
receive from the server a photoacclimation schedule for one or more plants, wherein the server calculates the photoacclimation schedule based on the user input; and
generate control signals that adjust light output of at least one luminaire to implement the photoacclimation schedule.

2. The apparatus of claim 1, wherein the user input comprises at least one of genus, species, variety, and cultivar of the one or more plants.

3. The apparatus of claim 1, wherein the photoacclimation controller is further configured to adjust the photoacclimation schedule based on further input from at least one of a user and a sensor.

4. The apparatus of claim 3, wherein the further input comprises at least one of start time, run time, light level entered, a ramp-up duration, a ramp-down duration, duration of the photoacclimation schedule, and maximum dimming.

5. The apparatus of claim 3, wherein the photoacclimation controller is further configured to dynamically adjust the photoacclimation schedule during implementation of the photoacclimation schedule based on the further input.

6. The apparatus of claim 1, wherein the photoacclimation schedule comprises PPFD (photosynthetic photon flux density) values for one or more stages of growth and the photoacclimation controller is further configured to adjust the light output based on the PPFD values.

7. The apparatus of claim 6, wherein the PPFD values increase over time.

8. A method, comprising:
receiving, via a user interface of a controller, user input for generating a photoacclimation schedule for one or more plants;
transmitting, by the controller, the user input to a server;
receiving, at the controller, the photoacclimation schedule from the server, wherein the server calculates the photoacclimation schedule based on the user input; and
generating, by the controller, control signals that adjust light output of at least one luminaire to implement the photoacclimation schedule.

9. The method of claim 8, wherein the user input comprises at least one of: genus, species, variety, and cultivar of the one or more plants.

10. The method of claim 8, further comprising:
adjusting the photoacclimation schedule based on further input from at least one of a user and a sensor.

11. The method of claim 10, wherein the further input comprises at least one of start time, run time, light level entered, a ramp-up duration, a ramp-down duration, duration of the photoacclimation schedule, and maximum dimming.

12. The method of claim 10, wherein adjusting the photoacclimation schedule comprises dynamically adjusting the photoacclimation schedule during implementation of the photoacclimation schedule based on the further input.

13. The method of claim 8, wherein the photoacclimation schedule comprises PPFD (photosynthetic photon flux density) values for one or more stages of growth, and the control signals adjust the light output of the at least one luminaire based on the PPFD values.

14. The method of claim 8, further comprising:
transmitting the control signals to the at least one luminaire; and
adjusting, by the at least one luminaire, the light output of the at least one luminaire according to the photoacclimation schedule.

15. A system, comprising:
a photoacclimation controller configured to generate control signals based on a photoacclimation schedule;
a user interface configured to receive user input to the photoacclimation controller, the photoacclimation schedule based on the user input;
a plurality of luminaires configured to emit light suitable for photosynthesis in plants at a plurality of different selectable levels of light output;
a communications network via which the control signals are provided to the plurality of luminaires, the luminaires adjusting the light output in response to the control signals; and
a server communicatively coupled to the photoacclimation controller via the communications network, wherein:
the controller is further configured to transmit the user input to the server and receive the photoacclimation schedule from the server; and
the server is configured to calculate the photoacclimation schedule based on the user input.

16. The system of claim 15, wherein the photoacclimation controller is further configured to adjust the photoacclimation schedule based on further input from at least one of a user and a sensor.

17. The system of claim 15, wherein the user input comprises at least one of: genus, species, variety, and cultivar of plants to be photoacclimated.

18. The system of claim 15, wherein the server is further configured to adjust the photoacclimation schedule based on further input from at least one of a user and a sensor.

* * * * *